US006354012B1

United States Patent
Pettersson

(10) Patent No.: US 6,354,012 B1
(45) Date of Patent: *Mar. 12, 2002

(54) DEVICE FOR DETERMINING THE DIMENSIONS OF THREE-DIMENSIONAL OBJECTS

(75) Inventor: Bo Pettersson, Torshälla (SE)

(73) Assignee: C E Johansson AB, Eskiltuna (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,166
(22) PCT Filed: Dec. 20, 1996
(86) PCT No.: PCT/SE96/01730
 § 371 Date: Jul. 2, 1998
 § 102(e) Date: Jul. 2, 1998
(87) PCT Pub. No.: WO97/25588
 PCT Pub. Date: Jul. 17, 1997

(30) Foreign Application Priority Data

Jan. 9, 1996 (SE) ................................ 9600078

(51) Int. Cl.[7] .......................... G01B 5/008; G01B 7/008
(52) U.S. Cl. ............................ 33/503; 33/551
(58) Field of Search .................. 33/503, 1 M, 1 MP, 33/556, 558, 559, 561, 551

(56) References Cited

U.S. PATENT DOCUMENTS

| | | | | |
|---|---|---|---|---|
| 4,166,323 A | * | 9/1979 | Maag | 33/551 |
| 4,679,331 A | * | 7/1987 | Koontz | 33/503 |
| 4,888,877 A | * | 12/1989 | Enderle et al. | 33/503 |
| 5,189,806 A | * | 3/1993 | McMurtry et al. | 33/503 |
| 5,276,974 A | | 1/1994 | Chanoni et al. | 33/503 |
| 5,287,629 A | | 2/1994 | Pettersson | 33/503 |
| 5,396,712 A | * | 3/1995 | Herzog | 33/503 |
| 5,768,792 A | * | 6/1998 | Raab | 33/503 |
| 5,778,549 A | * | 7/1998 | Campanile | 33/503 |

FOREIGN PATENT DOCUMENTS

EP 0 672 885 9/1995

* cited by examiner

*Primary Examiner*—Christopher W. Fulton
(74) *Attorney, Agent, or Firm*—Young & Thompson

(57) ABSTRACT

The present invention relates to an arrangement for determining dimensions in a three-dimensional object. According to the invention, the arrangement includes a pillar (2), an arm (3) which is mounted fro linear movement in a rotatable guide member (4) that is carried by the pillar and rotatable about the longitudinal axis (Z—Z) of the pillar and also about an axis (X—X) perpendicular to the longitudinal axis (Z—Z). The arrangement further includes a measuring probe attached to one end of the arm, and angle indicators (8, 9) for measuring rotation of the rotatable guide member about its rotational axes, and a scale (10) for measuring linear movement of the arm.

4 Claims, 1 Drawing Sheet

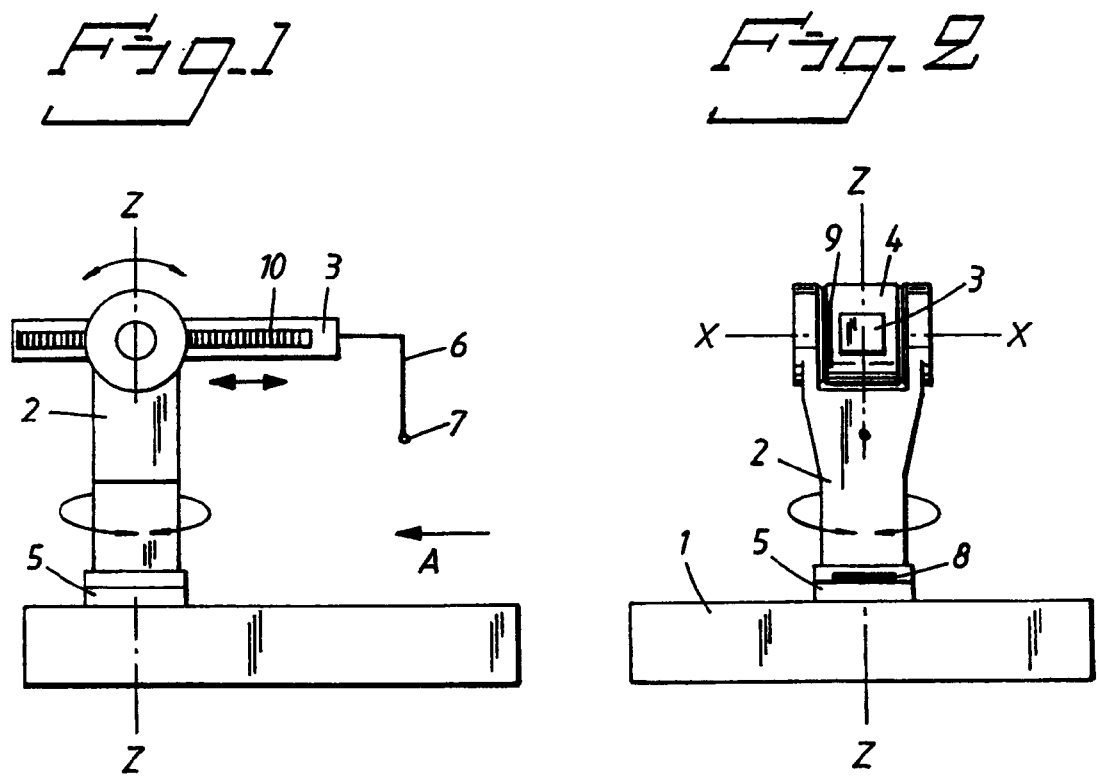
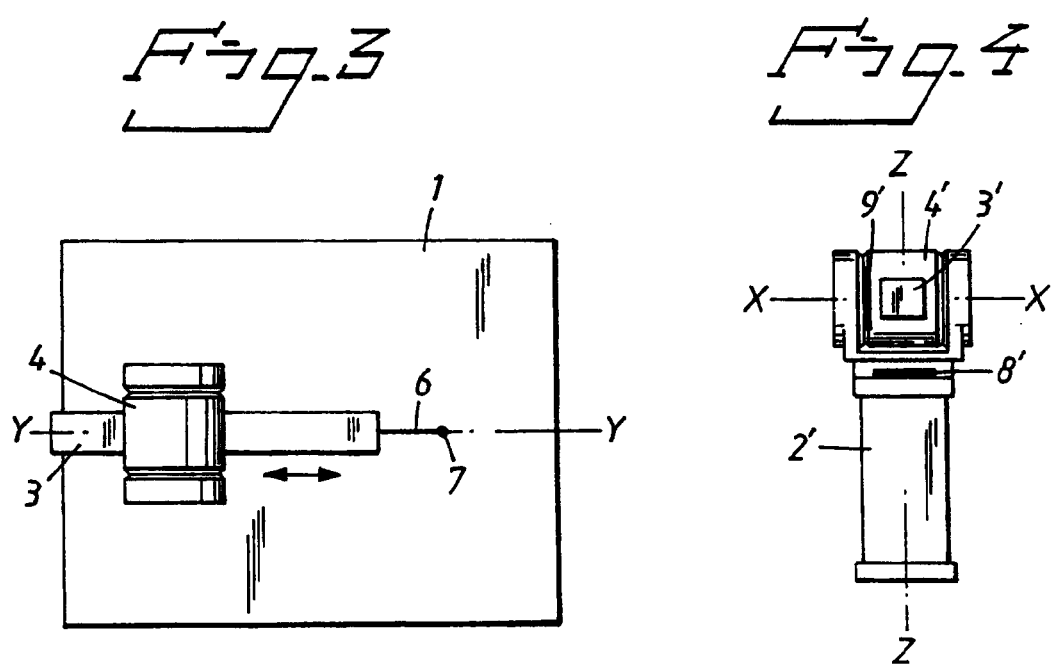

DEVICE FOR DETERMINING THE DIMENSIONS OF THREE-DIMENSIONAL OBJECTS

The present invention relates to an arrangement for determining dimensions of and distances on three-dimensional objects.

In the workshop industry, mechanical or electronic vernier calipers are used traditionally to measure distances between points on an object to be measured. However, it is sometimes the case that the shape or configuration of the object to be measured is such as to make it impossible to apply calipers in order to measure distances between certain points on the object. This is primarily the case when measuring in three dimensions. Such measurements can be readily determined in traditional coordinate measuring machines. However, these machines are much too expensive and much too complicated in many cases, for instance in the case of small workshops and/or simple production items. There is therefore a need for a simple measuring arrangement that will enable aspects of three-dimensional objects to be measured irrespective of the shape of these objects.

The object of the present invention is to provide a three-dimensional object measuring arrangement of simple construction which has a low manufacturing cost and which can be easily manoeuvered manually. The invention also relates to an arrangement of such principle construction as to enable a truly portable mini-measuring machine to be obtained.

This object is achieved in accordance with the invention with an arrangement of the kind defined in the introduction and is characterized in that said arrangement includes a pillar, an arm, which is journalled for linear movement in a rotatable guide member which is carried by the pillar and which is rotatable about the longitudinal axis of said pillar and an axis perpendicular thereto, a measuring probe mounted on one end of the arm, and an angle indicator for measuring rotational movements of the guide member about its rotational axes, and a scale for measuring linear movement of the arm.

In one preferred embodiment of the invention, the pillar is supported by a foot and is rotatable about its longitudinal axis. The height of the pillar can also be adjusted. The measuring probe includes a measuring tip holder which carries a measuring tip in the form of a measuring ball or the like at one end thereof and the other end of which holder is attached to the arm for rotation about an axis that extends parallel with the rotational axis of the arm. The arrangement also includes means for calculating and disclosing the distance between successive placements of the measuring tip, with the aid of the angle indicator values current at that time and with the aid of the linear scale values current at that time, in response to rotation and linear movement.

In one variant of the arrangement, the pillar includes an upper part which carries the guide member and the arm and which is rotatably connected to the remainder of the pillar.

The invention will now be described with reference to the accompanying drawing, in which FIG. 1 is a schematic side view of a first embodiment of an inventive measuring arrangement;

FIG. 2 is a view of the measuring arrangement seen in the direction of arrow A in FIG. 1;

FIG. 3 is a view of the measuring arrangement of FIG. 1 from above; and

FIG. 4 is a view similar to FIG. 2 illustrating a second embodiment of an inventive measuring arrangement.

The measuring arrangement shown in FIGS. 1–3 is placed on a table 1 and includes an upstanding pillar 2 and an arm 3 which is carried by the pillar 2 through the medium of a rotatable guide member 4 journalled in the upper part of the pillar and rotatable about an axis X—X perpendicular to the longitudinal axis Z—Z of the pillar. The arm 3 is mounted for linear movement in the guide member 4 in a direction perpendicular to the rotational axis X—X of the guide member. In the illustrated embodiment, the pillar 2 is journalled in a foot 5 and is rotatable about its longitudinal axis Z—Z. The arm 3 carries at one end a measuring tip holder 6 whose free end carries a measuring tip 7 in the form of a measuring ball or like means.

The arrangement also includes angle indicators 8, 9 which function to measure angular rotation of the pillar 2 about its longitudinal axis Z—Z and rotation of the guide member 4 about its rotational axis X—X. Linear movement of the arm 3 is measured by means of a linear measuring scale 10. The angle indicators may be capacitive indicators, in accordance with Swedish Patent No. 411 392, and the measuring scale may be designed in accordance with this latter patent or may be of a conventional incremental kind. The angle indicators and the measuring scale are conveniently connected to a computing unit which computes the positions of each measuring point in Cartesian coordinates on the basis of the measurement values obtained with each measuring point, by traditional trigonometry.

The described measuring arrangement is manoeuvered by gripping the measuring tip holder 6 in one hand and bringing the measuring tip 7 into abutment with a given measuring point on the object to be measured. FIGS. 1–3 illustrate a suitable arrangement in which the rotational axes X—X and Z—Z intersect one another and the longitudinal axis Y-Y of the arm 3 extends through this point of intersection. As a result, linear movement of the arm 3 will not give rise to torque forces about its axes, which facilitates manual manoeuvering of the measuring tip. Furthermore, this intersection point will constantly lie in the same place as the measuring tip is moved, therewith simplifying the computations applied in determining the position of the measuring tip in Cartesian coordinates. Other geometries in which solely two axes intersect one another or in which possibly none of the axes intersect one another, may alternatively be used.

The computing unit is preferably placed in a separate container means which also includes a display and a keypad connected to the computing unit. The foot will also conveniently include a connector socket for connecting the arrangement electrically to peripheral equipment, such as to a personal computer or a printer.

FIG. 4 illustrates a second embodiment of an inventive measuring arrangement. The arrangement according to FIG. 4 differs from the arrangement according to FIGS. 1–3 solely by virtue of the fact that only that part of the pillar 2' that carries the rotatable guide member 4' is rotatable about the axis Z—Z. Those components of the FIG. 4 embodiment that find correspondence in the embodiment illustrated in FIGS. 1–3 have been designated the same reference signs with the addition of a prime.

The described embodiment can be modified in several ways within the scope of the invention. For instance, the measuring tip holder 6 may be mounted on the measuring arm 3 for rotation about an axis which is parallel with the rotational axis X—X of the rotatable guide member 4 and/or rotatable about the longitudinal axis of the measuring arm. In the simplest case, the measuring tip holder rotates continuously and smoothly around the axis/axes and can therewith be locked in any selected position with the aid of a simple clamp means. In order to enable settings to be changed during an ongoing measuring process, fixed reference points intended to this end may be placed permanently on the measuring arrangement. Alternatively, there can be used original points on the object to be measured that have been chosen to this end. In this case, the measuring procedure is commenced by recording the positions of these measuring points on the object, with the measuring tip holder positioned in selected setting angles. After each setting change, a new reference measurement is taken against the reference points or objects, whereby the system is able to take the changed settings into account automatically when computing the cartesian coordinates.

Alternatively, the measuring tip holder 6 can be arranged in a manner such as to enable its rotation around one or two axes to be made indexable, i.e. in the form of discrete steps of predetermined known magnitude. Such an embodiment renders unnecessary the aforesaid reference measurements against selected reference points or objects. To facilitate handling procedures, this latter embodiment of the measuring arrangement can be readily provided with electrical contact means that pass information relating to the current rotational position of the measuring tip holder directly to the computing unit.

In a further developed embodiment of the invention, a known angle indicator may be mounted in each of the rotational joints of the measuring tip holder. It is also feasible to provide the measuring tip holder with further rotational joints. The pillar 2 may also have an adjustable length, for instance may be telescopically extendable and adjustable with the aid of a screw-nut mechanism or the like. The foot 5 is preferably provided with attachment means which enable it to be anchored firmly to a supportive surface, such as a machine table. It is also conceivable for the foot 5 to be a magnetic foot. Neither is it absolutely necessary to place the measuring arrangement on a supportive surface, but that the arrangement can be supported in any position, for instance may be suspended. The arrangement may also be constructed in a manner which enables it to be placed directly on the object to be measured. Although the measuring arrangement is constructed primarily to facilitate manual manoeuvering of the measuring tip and to provide a measuring machine of small dimensions, it is naturally possible to provide the arrangement with drive means for said two rotational movements and said linear movement. The invention is therefore restricted solely by the contents of the following claims.

What is claimed is:

1. Apparatus for determining dimensions in a three-dimensional object, comprising a pillar (2; 2'), a rotatable guide member (4; 4') which is carried by the pillar and which is rotatable about the longitudinal axis (Z—Z) of said pillar and also about a second axis (X—X) perpendicular to said longitudinal axis, an arm (3; 3') mounted for linear movement in and relative to said rotatable guide member (4; 4') along a third axis (Y—Y) that is perpendicular to said second axis, a measuring probe mounted on one end of said arm, and angle indicators (8, 9; 8', 9') for measuring rotation of the guide member about said longitudinal and second axes, and a scale (10) for measuring linear movement of the arm along said third axis, said longitudinal and second and third axes intersecting at a common point.

2. Apparatus according to claim 1, wherein the pillar (2) is supported by a foot (5) and is rotatable about said longitudinal axis (Z—Z).

3. Apparatus according to claim 1, wherein the pillar (2') includes an upper section which carries the rotatable guide member (4') and the arm (3'), said upper section being rotatably connected to the remainder of the pillar for rotation about said longitudinal axis (Z—Z).

4. Apparatus according to claim 1, wherein said angle indicators (8,9; 8',9') are capacitive indicators.

* * * * *